United States Patent [19]

Watanabe et al.

[11] Patent Number: 4,653,802
[45] Date of Patent: Mar. 31, 1987

[54] VEHICLE ROOF AND DOOR CONNECTION

[75] Inventors: Hiroyuki Watanabe, Toyota; Mikio Ohashi, Aichi, both of Japan

[73] Assignee: Toyota Jidosha Kabushiki Kaisha, Japan

[21] Appl. No.: 592,700

[22] Filed: Mar. 23, 1984

[30] Foreign Application Priority Data

Apr. 22, 1983 [JP] Japan ............................. 58-60467[U]

[51] Int. Cl.⁴ ..................... B62D 27/00; B62D 25/06; B62D 25/07
[52] U.S. Cl. .................................. 296/203; 296/146; 296/210; 296/213; 49/428
[58] Field of Search ................. 296/14, 146, 151, 154, 296/201–203, 206, 210, 213, 187; 49/374, 428

[56] References Cited

U.S. PATENT DOCUMENTS

| | | | |
|---|---|---|---|
| 4,036,522 | 7/1977 | DeRees et al. | 296/210 |
| 4,240,227 | 12/1980 | Hasler et al. | 49/348 |
| 4,266,824 | 5/1981 | Inamoto | 296/210 |
| 4,304,435 | 12/1981 | Everts et al. | 296/213 |
| 4,417,762 | 11/1983 | Imai et al. | 296/213 |
| 4,454,688 | 6/1984 | Rest et al. | 49/502 |
| 4,457,111 | 7/1984 | Koike | 49/441 |
| 4,494,337 | 1/1985 | Watanabe et al. | 49/374 |

FOREIGN PATENT DOCUMENTS 2736225  2/1978  Fed. Rep. of Germany ...... 296/210
2818225 10/1979  Fed. Rep. of Germany ...... 296/146

Primary Examiner—Robert B. Reeves
Assistant Examiner—Dennis H. Pedder
Attorney, Agent, or Firm—Finnegan, Henderson Farabow, Garrett & Dunner

[57] ABSTRACT

A vehicle roof and door connection having a panel member for covering a portion of the exterior of the vehicle. The panel member includes a roof portion and a side portion. The side portion contains an upper end connected to the roof portion and a lower end. The lower end is spaced from the upper end and includes an engagement member. The panel member also includes a channel recessed along the upper end. A support frame is connected to the panel member along the interior of the vehicle through an attachment member having an upper frame and a lower frame. The upper frame contains a first planar portion adjacent the support frame and the second planar portion adjacent the engagement member. The lower frame includes an inner extension and an outer extension. The inner extension is secured to the upper frame, while the outer extension extends along the exterior of the vehicle proximate the lower end to form a gap between the outer extension and the lower end, which is filled with a sealing resin. A door frame supports a window and engages the lower frame when the door is closed.

7 Claims, 4 Drawing Figures

VEHICLE ROOF AND DOOR CONNECTION

BACKGROUND OF THE INVENTION

1. Field of the Invention

This invention relates to a construction of a roofside portion of a motor vehicle, and more particularly to improvements in a construction of a roofside portion of a so-called flush surface type motor vehicle in which the outer surfaces of a vehicle body, doors and window glasses are substantially flush with one another.

2. Description of the Prior Art

As shown in FIG. 2 for example, the conventional construction of the roofside portion of the motor vehicle generally comprises a roofside rail 2 including a roofside rail outer 2A and a roofside rail inner 2B, which are connected to a side end portion of a roof 1; an upper side 3A of a door frame 3 of a side door, not shown generally; and a door weather strip 4 secured to the outer peripheral portion of the upper side 3A and adapted to be clamped between the outer side surface of the roofside rail 2 and the upper side 3A of the door frame 3 when the door is closed, to thereby provide the sealing between the door and the vehicle body.

In FIG. 2, a door glass 5 is shown, as well as a drip channel 6, which is formed at a connecting portion between the roofside rail 2 and the roof 1.

In the conventional construction of the roofside portion of the motor vehicle as shown in FIG. 2, a difference in continuity denoted by reference numeral 8 is formed between the outer surface of the roofside rail 2 and the outer surface of the door frame 3 to prevent water coming down along the roof 1 and the roofside rail 2 from intruding into a compartment 7 when the door is fully closed during rainy weather or the like, and, in general, another difference in surface continuity denoted by reference numeral 9 is also formed between the door glass 5 and the outer surface of the roofside rail 2 because the door glass 5 is disposed inwardly of the outer surface of the door frame 3.

Among the disadvantages of this structure are the following: air resistance is increased, a so-called wind breaking sound is caused during high speed running of the vehicle and the outer appearance of the vehicle is deteriorated.

SUMMARY OF THE INVENTION

It is therefore the object of the present invention is to provide a construction of a roofside portion of a motor vehicle, in which the outer surfaces of a roof, a door frame and a door glass are substantially flush with one another, whereby air resistance during running of the motor vehicle at high speed is reduced, the wind breaking sound is controlled and the outer appearance of the motor vehicle is improved.

To achieve the foregoing, the present invention comprises a roof, a side portion of which in the widthwise direction of the vehicle body covers an upper portion of a roofside rail and extends to a position outwardly of the roofside rail in the widthwise direction thereof, a roofside molding secured to an end portion of the roof in the widthwise direction of the vehicle body and covering the outer side and the undersurface of the end portion, an upper side of a door frame, a door weather strip adapted to be clamped between the upper side of the door frame and the roofside molding when a door is closed, a door glass and a door glass weather strip secured to the door frame in a manner to be clamped between an upper end edge portion of the door glass and the upper side of the door frame when the door glass is closed, wherein the outer surfaces of the side portion of the roof, the roofside molding, the upper side of the door frame, the door weather strip, the door glass weather strip and the door glass are substantially flush with one another in a manner to be smoothly continued when the door glass and the door are fully closed.

The present invention also contemplates that the undersurface of the roofside molding contacting the upper surface of the door weather strip when the door is closed is formed to provide an inclined surface directed outwardly in the widthwise direction of the vehicle body, whereby storm water and the like are prevented from intruding into a compartment, while not providing a difference in surface continuity between the door frame and the roof.

The present invention also contemplates that the roof is provided at the side end portion thereof with a channel extending inwardly in the widthwise direction of the vehicle body and connecting the end portion of the roof to the roofside rail, and the roofside molding is secured to the channel at a position between the end portion of the roof in the widthwise direction of the vehicle body and the roofside rail, whereby the roofside molding is firmly supported, so that the sealing performance between the roofside molding and the door weather strip can be improved and the outer appearance can be enhanced.

The present invention also contemplates that the channel extends outwardly of the end portion of the roof in the widthwise direction of the vehicle body, at a position inwardly of the roofside molding, and is brought into contact at the forward end portion thereof with the rear surface of the molding to support it from inside, whereby the roofside molding is held to be flush with the outer surface of the vehicle body.

The present invention also contemplates that a drip channel is recessed inwardly of the vehicle body at the side of the roof at a position close to the upper end portion of the roofside rail and the rear portion of the drip channel is connected to the upper end portion of the roofside rail, whereby the roofside portion is increased in rigidity and the conventional difference in stage between the roofside and the roof is eliminated.

The present invention further contemplates that a slide piece is secured to the end portion of said door glass through a screw and a bracket is slidably coupled into one of front and rear posts of said door frame, so that the door glass is slidably guided in the vertical direction, and the outer surfaces of said door glass and said door frame are substantially flush with each other.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE PREFERRED EMBODIMENT

Description will hereafter be given of an embodiment of the present invention with reference to the drawings.

Figure 1:
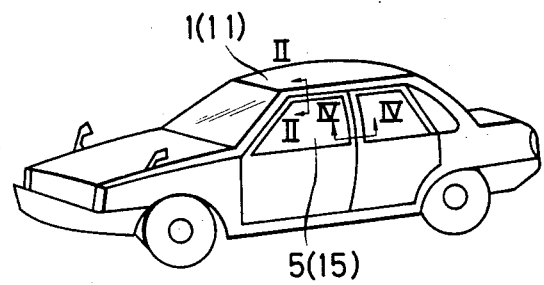
FIG. 1 is a perspective view showing the outer appearance of the motor vehicle, to which the present invention is to be applied.
Figure 2:
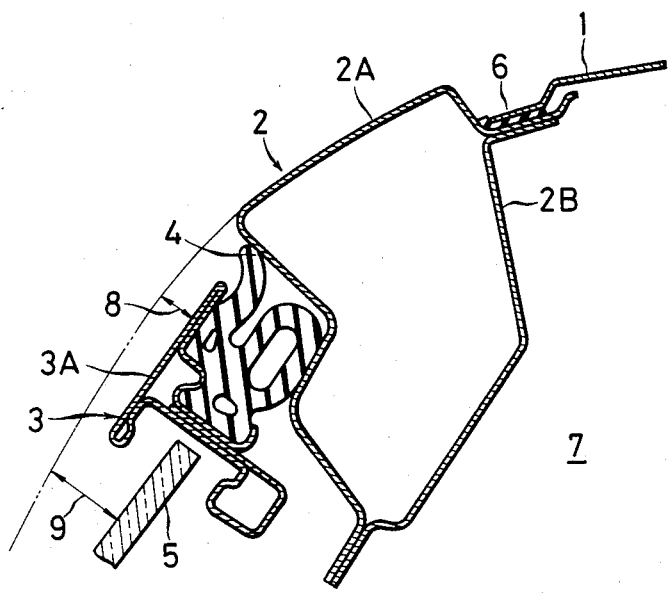
FIG. 2 is an enlarged sectional view taken along the line II—II in FIG. 1, showing the conventional construction of the roofside portion of the motor vehicle.
Figure 3:
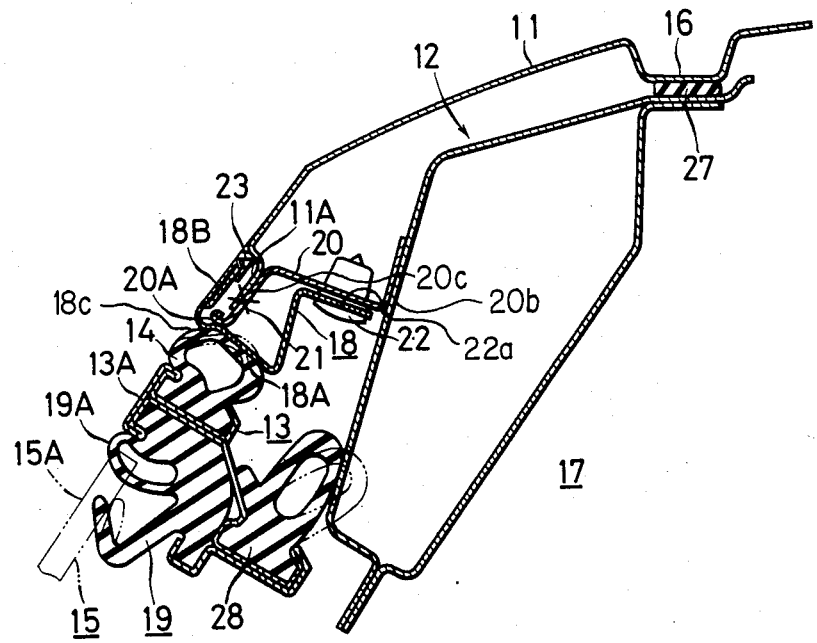
FIG. 3 is an enlarged sectional view similar to FIG. 2, showing an embodiment of the construction of the roofside portion of the motor vehicle according to the present invention.

As shown in FIG. 3, this embodiment comprises panel means having a roof portion (unnumbered) and a side portion 11 of which the side portion 11 extends in the widthwise direction of the vehicle body and covers an upper portion of a support frame such as roofside rail 12 and extends to a position outwardly of the roofside rail 12 in the widthwise direction thereof, attaching means including an upper frame 20 and a lower frame member or roofside molding 18 secured to engagement means, i.e. an end portion 11A of the roof 11 having a bend point and an inward section in the widthwise direction of the vehicle body, wherein a gap is formed between the bend point and an outer extension (outer surface portion) 18B and wherein the inward section is welded to the upper frame member 20. The embodiment further comprises door frame means for supporting a window 15 and for engaging the attaching means when the door is closed, the door frame means comprising a door frame 13, a door weather strip (door lining) 14 adapted to be clamped between the upper side (retention means) 13A of the door frame 13 and the roofside molding 18 when a door is closed, the door glass 15 and a door glass weather strip or lining 19 secured to the door frame 13 in a manner to be clamped between an upper end edge portion 15A of the door glass 15 and the upper side 13A of the door frame 13 when the door glass 15 is closed, wherein the outer surfaces of the side portion of the roof 11, the roofside molding 18, the upper side 13A of the door frame 13, the door weather strip 14, the door glass weather strip 19 and the door glass 15 are substantially flush with one another in a manner to be smoothly continued when the door glass 15 and the door are fully closed, to thereby complete the construction of the roofside portion of the motor vehicle.

In the roofside molding 18, an undersurface 18A thereof, which contacts the upper surface of the door weather strip 14 when the door is closed, is formed to provide an inclined surface directed outwardly in the widthwise direction of the vehicle body, whereby the inclined surface is brought into pressing contact with the door weather strip 14 when the door is closed, so that the door weather strip 14 cannot be pushed inwardly.

A frame member 20 is welded at a weld point 21 to the end portion 11A of the roof 11. The frame member 20 extends inwardly in the widthwise direction of the vehicle body and connects the end portion 11A of the roof 11 to the roofside rail 12 through a first planar portion 20B adjacent the roofside rail 12 and a second planar portion 20C adjacent the end portion 11a.

The roofside molding 18 is threadably secured to the frame member 20 along an inner extension 22a through a screw 22 at a position between the end portion 11A of the roof 11 in the widthwise direction of the vehicle body and the roofside rail 12.

The roofside molding 18 extends from the position where the molding 18 is threadably secured through the screw 22 to the outer surface of the vehicle body, where an outer surface portion 18B, i.e. the outer extension of the roofside rail 18, is formed which is bent and extended so as to be flush with the roof 11. The undersurface 18A extends inward from the outer surface portion 18B, as shown in FIG. 3.

According to the present invention, the outer surface 18B of the roofside molding 18 is extended so that the weld point 21 between the end portion 11A of the roof 11 in the widthwise direction of the vehicle body and the frame member 20 is covered from outside.

Furthermore, the frame member 20 is extended outwardly of the end portion 11A of the roof 11 in the widthwise direction of the vehicle body, at a position inwardly of the roofside molding 18, and brought into contact at a hooked means, such as forward end portion 20A thereof with the lower end of the outer surface portion 18B of the roofside molding 18, to thereby support the outer surface portion 18B from inside.

As shown in FIG. 3 sealing means or protector 23 is made of synthetic resin secured to the upper end of the outer surface portion 18B of the roofside molding 18, which is doubly bent, and interposed between the outer surface portion 18B and the roof 11 and connecting the both members to each other.

Furthermore, the forward end portion 20A of the frame member 20, which supports the outer surface portion 18B of the roofside molding 18 from rear side, is brought into contact with the upper surface of a portion of the inclined undersurface 18A of the roofside molding 18, the portion being positioned outwardly in the widthwise direction of the vehicle body, to thereby prevent the roofside molding 18 from moving upwardly.

Figure 4:
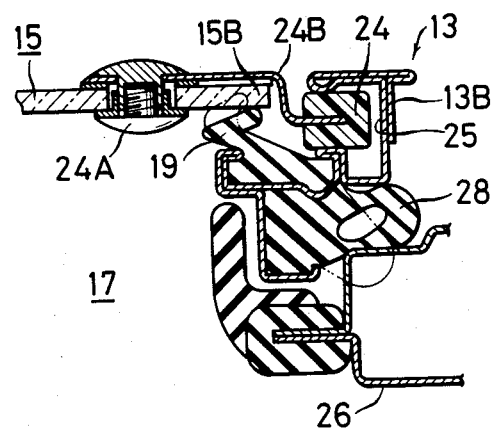
FIG. 4 is an enlarged sectional view taken along the line IV—IV in FIG. 1.

As shown in FIG. 4, for example, in the door glass 15, a slide piece 24 is secured to the side end portion 15B of the door glass 15 through a screw 24A and a bracket 24B is slidably coupled into one of guide grooves 25 formed in front and rear posts 13B of the door frame 13, slidably guided in the vertical direction, and the outer surfaces of the door glass 15 and the door frame 13 can be substantially flush with each other. In FIG. 4, designated at 26 is a center pillar.

Here, the door glass weather strip 19 is positioned inwardly of the guide groove 25 in the compartment 17 and brought into contact with the inner surface of the door glass 15.

Furthermore, as shown in FIG. 3, the upper side 19A of the door glass weather strip 19 is clamped between an upper side edge portion 15A of the door glass 15 and the door frame 13 by the upper side edge portion 15A when the door glass 15 is fully closed, and, at this time, the outer surface of the upper side portion 19A of the door glass weather strip 19 is substantially flush with the outer surfaces of the door glass 15 and the door frame 13.

A drip channel 16 is recessed inwardly of the vehicle body at the side of the roof 11 at a position close to the upper end portion of the roofside rail 12 and the rear portion of the drip channel 16 is connected to the upper end portion of the roofside rail 12 through affixing means, such as a bonding agent 27.

In FIG. 3 a main door weather strip 28 is secured to the door frame 13 at a position in the rear of the door glass weather strip 19 and abutting the roofside rail 12, for sealing a space formed between the door and the vehicle body when the door is closed.

In this embodiment, the side portion of the roof 11 in the widthwise direction of the vehicle body covers the roofside rail 12, and all of the members disposed outwardly of the roofside rail 12, including the roofside molding 18, the door weather strip 14, the upper side 13A of the door frame 13, the door glass weather strip 19 and the upper side edge portion 15A of the door glass 15, form a smooth continuous line up to the outer surface of the roof 11 with the outer surfaces substantially flush with one another, so that the air resistance and the wind breaking sound is reduced during running of the motor vehicle and the outer appearance of the vehicle is improved.

Particularly, in this embodiment, the inclined surface 18A of the roofside molding 18 is directed outwardly in the widthwise direction of the vehicle body. The inclined surface 18A is brought into pressing contact with the door weather strip 14 when the door is closed to prevent the door weather strip 14 from moving inwardly, whereby the outer surface of the door weather strip 14 is held to be flush with the outer surface of the vehicle body, so that flush conditions can be maintained without sealing performance being impaired against storm water and the like.

Furthermore, in this embodiment, the roof 11 is provided at the side end portion thereof with a frame member 20 extending inwardly in the widthwise direction of the vehicle body and connecting the end portion of the roof 11 to the roofside rail 12. The roofside molding 18 is secured to the frame member 20 at a position between the end portion 11A of the roof 11 in the widthwise direction of the vehicle body and the roofside rail 12, whereby the side end portion of the roof 11 is increased in rigidity, so that the roofside molding 18 can be firmly supported to be in pressing contact with the door weather strip 14 along inclined surface 18A and an adjacent ridge 18C, thus securing the reliable sealing.

Further, the portion where the roofside molding 18 is secured to the frame member 20 is positioned inwardly of the outer surface of the vehicle body, so that the outer appearance of the vehicle can be improved.

The outer surface portion 18B of the roofside molding 18 is disposed so as to cover the weld point 21 between the roof 11 and the channel 20 from outside, so that the weld traces can be covered to improve the outer appearance of the vehicle.

The frame member 20 extends inwardly of the molding 18 and outwardly of the end portion 11A of the roof 11 in the widthwise direction of the vehicle body and is brought into contact at the forward end 20A thereof with the rear surface of the outer surface portion 18B of the roofside molding 18 to support it from inside, whereby the outer surface portion 18B of the roofside molding 18 is held to be substantially flush with the outer surface of the vehicle body.

Furthermore, the roofside molding 18 is restricted by the forward end portion 20A of the frame member 20 from being displaced upwardly, whereby the roofside molding 18 is held in close contact with the door weather strip 14 when the door is closed, thus improving the sealing performance.

In this embodiment, a drip channel 16 is recessed inwardly of the vehicle body at the side of the roof 11 at a position close to the upper end portion of the roofside rail 12, and the base portion of the drip channel 16 is connected to the upper end portion of the roofside rail 12, so that the roofside portion is increased in rigidity and the irregularities on the outer surface of the vehicle body in the vicinity of the roofside portion can be reduced by covering the roofside rail 12, to thereby decrease the air resistance of the vehicle.

In the above embodiment, as shown in FIG. 4, the guide grooves 25 are formed in the front and rear posts 13B of the door frame 13, and further, the door glass 15 is vertically guided by the guide grooves 25 through the slide pieces 24. The present invention need not necessarily be limited to this construction, i.e., the relationship between the front and rear posts 13B of the door frame 13 and the door glass 15 may be determined such that the outer surface of the door glass 15 is substantially flush with the outer surface of the door frame 13 during the guiding.

What is claimed is:

1. A vehicle roof and door connection comprising:
   panel means for covering a portion of the exterior of the vehicle including a roof portion and a side portion, said side portion having an upper end connected to said roof portion and a lower end spaced from said upper end and having engagement means, said panel means also including a channel recessed along said upper end;
   a support frame connected to said panel means within the interior of the vehicle;
   means for attaching said support frame to said engagement means, said attaching means including an upper frame and a lower frame, said upper frame having a first planar portion adjacent said support frame and a second planar portion adjacent said engagement means, said lower frame having an inner extension and an outer extension, said inner extension secured to said upper frame, while said outer extension extends along the exterior of the vehicle proximate said lower end forming a gap therebetween;
   means interposed within said gap for sealing said gap; and
   door frame means for supporting a window and for engaging said attaching means when the door is closed, said door frame means including a door lining, a window lining and a frame piece extending along the exterior of the vehicle, said frame piece including means for retaining said door lining and said window lining on opposite sides of said frame piece, said window lining contacting a peripheral portion of said window.

2. The vehicle roof and door connection defined in claim 1, wherein said roof portion, said side portion, said sealing means and said outer extension define a contour line for the exterior of the vehicle and wherein said door frame means and said window are substantially aligned along said contour line when the door is closed.

3. The vehicle roof and door connection defined in claim 2 also including means for affixing said channel to said support frame.

4. The vehicle roof and door connection defined in claim 2, wherein said engagement means includes a bend point and an inward section extending therefrom, wherein said gap is between said bend point and said outer extension and wherein said inward section is welded to said second planar section.

5. The vehicle roof and door connection defined in claim 2, wherein said lower frame includes an inclined surface between said inner and said outer extensions, said inclined surface being inclined toward the exterior of the vehicle, said lower frame also including a ridge depending between said outer extension and said inclined surface, thereby forming a seal with said door lining when the door is closed.

6. The vehicle roof and door connection defined in claim 2, wherein said second planar portion includes hooked means for contacting and supporting said outer extension.

7. The vehicle roof and door connection defined in claim 2, wherein said door frame means include a weather strip abutting said support frame.

* * * * *